T. STUBBLEFIELD.
Pressure Gage.
No. 674
Reissued March 15, 1859
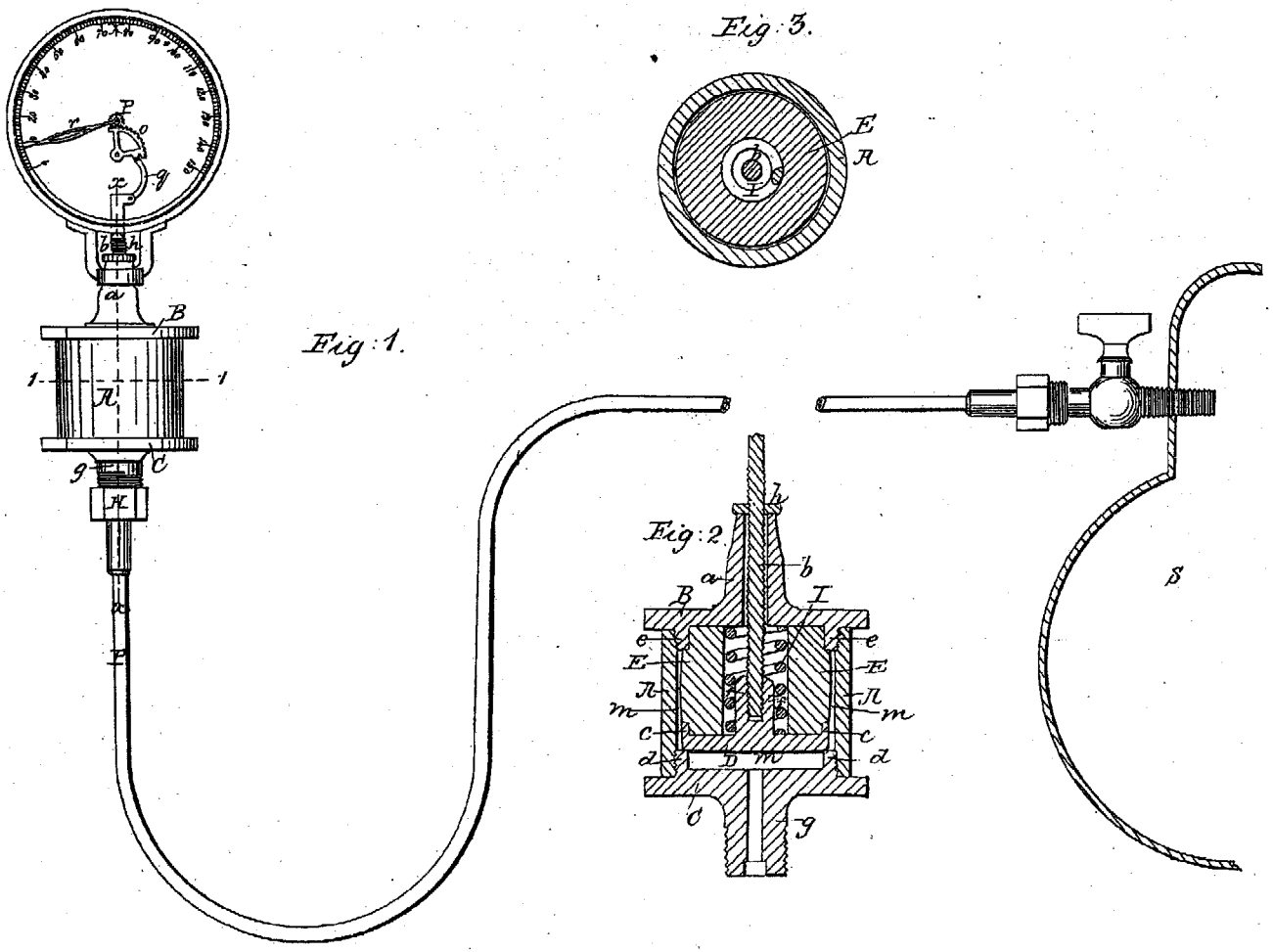
N. PETERS, Photo-Lithographer, Washington, D. C.

No Drawing Available.

UNITED STATES PATENT OFFICE.

THOMAS STUBBLEFIELD, OF COLUMBUS, GEORGIA.

IMPROVEMENT IN STEAM-GAGES.

Specification forming part of Letters Patent No. 11,333, dated July 18, 1854; Reissue No. 676, dated March 15, 1859.

*To all whom it may concern:*

Be it known that I, THOMAS STUBBLEFIELD, of Columbus, in the county of Muscogee, State of Georgia, have invented certain new and useful improvements in devices for measuring the pressure of fluids and also for closing the aperture for their admission or discharge, of which the following is a full, clear, and exact description, reference being had to the accompanying drawings, forming part of this specification, which represent these devices as applied to measure the pressure of fluids.

Figure 1 represents a side elevation of a steam-gage embracing my improvements and applied to a steam-boiler. Fig. 2 represents a transverse section on the line *x x* of Fig. 1, and Fig. 3 represents a transverse section on the line 1 1 of Fig. 1.

The apparatus consists of a cylindrical casing, A, closed at both ends by screw-glands B and C, with an exterior tubular nozzle, *a* and *g*, to each gland, by which a communication is made from either end with the interior of the casing. Within this casing is a spring-valve consisting of a rod or stem, *b*, the lower end which is screwed into a stud, *f*, on the center of a disk, D, which forms the base of the valve, and rests on a seat, *d*, formed by an annular projection, *l*, on the inner face of the lower gland, C. A rim, *c*, around the edge and on the upper face of the disk D, forms a cup to receive the lower end of a hollow cylindrical vulcanized-rubber spring, E, the upper end of which is received into a corresponding cup formed by an annular projection, *e*, on the interior face of the upper gland, B. The external diameter of the rubber spring is somewhat greater than the interior diameter of the flanges surrounding either end, that it may fit closely therein. On the interior of the rubber spring is a spiral wire spring, I, surrounding the stem without touching it, which for this purpose I prefer to make of hardened brass. The valve-rod *b* passes through and extends beyon the end of the upper tubular nozzle, *a*, which it loosely fits, and on the outer end of this rod is set a nut, *h*, which, on being screwed down, bears on the end of the nozzle *a*, holds the disk and gland B in close contact with the ends of the rubber spring, so as to form a tight joint, preventing the passage of either water or steam from below through the upper gland, while the external air has free communication with the interior of the valve.

To the valve-rod *b* may be attached a circular graduated indicator-plate, and connection made between the rod *b* and index-hand *v* by means of a link, *q*, pivoted at one end to the rod *b* and at the other end to a toothed sector, *o*, which gears into a pinion, P, on the axis of the index-hand.

This apparatus, when used as a steam-gage, is connected with a steam-boiler in the manner shown in the drawings, by means of a screw-coupling, H, which connects the nozzle *g* of the lower gland with a siphon-pipe, P, whose opposite end communicates with the interior of a steam-boiler, S, so that the steam will have free communication with the space *m* below the valve. The pressure of the steam in the boiler is transmitted through the pipe P, acts on the under side of the valve, raises it from its seat, compresses the springs until their resistance corresponds with the pressure of the steam in the boiler, and as the pressure of the steam in the boiler varies, increasing or diminishing, so also does the position of the valve change, and the valve-rod is protruded a greater or less distance beyond the end of the nozzle *a*. The motions of this rod through the connections previously described give motion to the index-hand, causing it to traverse the indicator-plate, which is graduated to correspond with the movement of the valve due to the varying pressure of the steam in the boiler to the square inch, and these graduations give that pressure in pounds. The spiral springs within the tubular rubber spring not only give to it greater power and strength, but prevent it from collapsing by the pressure of the steam on its outer surface, which, were it to do so, would bind the rod *b*, increase its friction, and thus prevent the gage from giving a true indication of the pressure of the steam in the boiler. If, however, the pressure to be indicated should be so low or the thickness of the rubber tube so great that there would be no liability of its collapsing, the wire spring may be omitted. To prevent the rubber spring when applied to steam-gages from being affected by heat so as to change its elasticity, the connection between the gage and the steam-boiler may be made by a long, small, inverted, siphon-pipe, and the gage placed in such position as to be several inches below the point at which the pipe enters the boiler, and it would in all cases be best if the lower bend of the pipe was below the bottom of the boiler, although its connection should be with the steam-space at the top.

From the arrangement of these devices, as described, it will be seen that the valve is pressed toward the seat by the action of the rubber spring; that the rubber spring also performs the office of a manometer-spring when pressure is applied to the face of the valve; that it packs the valve-stem without binding it, and that it also cuts off communication between the apertures in the opposite ends of the case without packing or binding on the sides of the case.

What I claim therein as new, and desire to secure by Letters Patent, is—

1. The combination of a case perforated at both ends with a spring-valve, the spring forming the sides of the valve being arranged so as to cut off communication between the perforations in the opposite ends of the case, and perform the duty of a manometer-spring, as described.

2. The combinations of valve, stem, disk, and gland with the interposed rubber spring, arranged substantially as described, so as to press the valve toward its seat and pack the valve-stem without the spring binding the valve-stem or the valve case.

In testimony whereof I have subscribed my name.

THOS. STUBBLEFIELD.

Witnesses:
F. SOUTHGATE SMITH,
JOHNS HOLLINGSHEAD.